US012343856B2

(12) United States Patent
Su

(10) Patent No.: US 12,343,856 B2
(45) Date of Patent: Jul. 1, 2025

(54) FOLDABLE HAND TOOL

(71) Applicant: HONG ANN TOOL INDUSTRIES CO., LTD., Taichung (TW)

(72) Inventor: Cheng-Wei Su, Taichung (TW)

(73) Assignee: HONG ANN TOOL INDUSTRIES CO., LTD., Taichung (TW)

( * ) Notice: Subject to any disclaimer, the term of this patent is extended or adjusted under 35 U.S.C. 154(b) by 303 days.

(21) Appl. No.: 18/079,349

(22) Filed: Dec. 12, 2022

(65) Prior Publication Data

US 2023/0256584 A1 Aug. 17, 2023

(30) Foreign Application Priority Data

Feb. 16, 2022 (TW) ................................. 111105668

(51) Int. Cl.
*B25G 1/06* (2006.01)
*B66F 15/00* (2006.01)

(52) U.S. Cl.
CPC ................ *B25G 1/06* (2013.01); *B66F 15/00* (2013.01)

(58) Field of Classification Search
CPC ...... Y10T 29/53835; B66F 15/00; B25G 1/06
See application file for complete search history.

(56) References Cited

U.S. PATENT DOCUMENTS

D244,252 S * 5/1977 Ardis ............................. D8/105
4,646,378 A * 3/1987 Borden ..................... B25F 1/04 7/138
4,741,060 A * 5/1988 Hose ....................... B25B 13/02 7/138
D337,492 S * 7/1993 Ryan ................................ D8/89
5,943,925 A 8/1999 Huang
6,308,355 B1 * 10/2001 McMillan ................. B25F 1/00 7/161
6,688,196 B2 2/2004 Warner
8,448,545 B1 * 5/2013 Argyle ................ B25B 23/1427 81/177.85
8,550,437 B2 * 10/2013 Liou ......................... B25F 1/00 81/145
8,695,463 B2 4/2014 Su
10,058,720 B2 * 8/2018 Weinmeister ......... B25B 13/065
10,150,212 B2 12/2018 Yu
11,260,507 B2 3/2022 Su
2002/0108473 A1 8/2002 Warner
2009/0265872 A1 * 10/2009 Eldessouky ........... A47L 13/254 15/144.1

(Continued)

FOREIGN PATENT DOCUMENTS

CN 201529954 U 7/2010
CN 204505105 U 7/2015

(Continued)

*Primary Examiner* — Jason L Vaughan
(74) *Attorney, Agent, or Firm* — MUNCY, GEISSLER, OLDS & LOWE, P.C.

(57) ABSTRACT

A foldable tool includes a first rod member, a second rod member and a pivoting device. The first rod member has a first length. The second rod member has a second length. The pivoting device is arranged between the first rod member and the second rod member. The first rod member and the second rod member are configured to be selectively pivotable to each other via the first pivoting device. A ratio of the first length to the second length is in a range between 1.1 and 6.

9 Claims, 5 Drawing Sheets

(56) References Cited

U.S. PATENT DOCUMENTS

| | | | |
|---|---|---|---|
| 2013/0291691 | A1 | 11/2013 | Su |
| 2017/0021476 | A1 | 1/2017 | Carnesi |
| 2017/0259423 | A1 | 9/2017 | Yu |
| 2020/0331127 | A1 | 10/2020 | Su |
| 2021/0162576 | A1 | 6/2021 | Su |

FOREIGN PATENT DOCUMENTS

| | | | |
|---|---|---|---|
| CN | 208323190 | U | 1/2019 |
| CN | 213319848 | U | 6/2021 |
| TW | 416363 | U | 12/2000 |
| TW | 453255 | U | 9/2001 |
| TW | 475501 | U | 2/2002 |
| TW | M537001 | U | 2/2017 |
| TW | I727611 | B | 5/2021 |
| TW | M618322 | U | 10/2021 |

* cited by examiner

FOLDABLE HAND TOOL

BACKGROUND

The present invention relates to a hand tool and, more particular, to a foldable hand tool.

Hand tools utilizing the principle of leverage, such as a crowbar or a nail puller, are commonly used to pry fixed objects or support heavy objects for laborsaving. Therefore, for the purpose of laborsaving, such hand tools usually have a longer handle to provide a longer force arm. However, a longer handle will cause to an increase in the overall length of the hand tool, which is not conducive to storage or transportation.

Thus, a need exists fir a hand tool to mitigate and/or obviate the above disadvantages.

SUMMARY

An objective of the present invention is to provide a tool with a segmented tool handle. The tool includes a first rod member, a second rod member and a first pivoting device. The first rod member has a first distal end, a first proximal end opposite to the first distal end and a first length defined between the first distal end and the first proximal end. The second rod member has a second distal end, a second proximal end opposite to the second distal end and a second length defined between the second distal end and the second proximal end. The first pivoting device is arranged between the first proximal end and the second proximal end. The first rod member and the second rod member are configured to be selectively pivotable to each other via the first pivoting device. A ratio of the first length to the second length is in a range between 1.1 and 6.

In an embodiment, the ratio of the first length to the second length is in a range between 1.9 and 3.

Further, the ratio of the first length to the second length is in a range between 3 and 4.

Furthermore, the ratio of the first length to the second length is in a range between 4 and 6.

In an embodiment, the second rod member is provided with a to working portion disposed at the second distal end.

In some embodiments, the working portion is a gooseneck crowbar head, a 90 degree angled crowbar head, or an oblique crowbar head. In an embodiment, the first rod member and the second rod member are respectively hollow.

In an embodiment, the first rod member is provided with a cover member mounted at the first distal end and a slip-proof portion formed on an outer periphery thereof and adjacent to the cover member.

In an embodiment, the first pivoting device includes a first pivoting member and a second pivoting member pivotally coupled to the first pivoting member, wherein the first pivoting member is fixed to the first proximal end of the first rod member via a first fastening device, wherein the second pivoting member is fixed to the second proximal end of the second rod member via a second fastening device, and wherein the first pivoting member and the second pivoting member are configured to be switchable between a locked position and an unlocked position to selectively pivot relative to each other about a pivoting axis.

In an embodiment, each of the first fastening device and the second fastening device includes two fastening holes and a fastener fixedly inserted through the two fastening holes.

In an embodiment, the foldable hand tool further includes a second pivoting device arranged between the second distal end and the working portion. The second distal end and the working portion are configured to be selectively pivotable to each other via the second pivoting device. The second pivoting device includes a third pivoting member and a fourth pivoting member pivotally coupled to the third pivoting member. The third pivoting member is fixed to the second distal end, and the fourth pivoting member is formed at the working portion.

The present invention will become clearer in light of the following detailed description of illustrative embodiments of this invention described in connection with the drawings.

DETAILED DESCRIPTION

Figure 1:
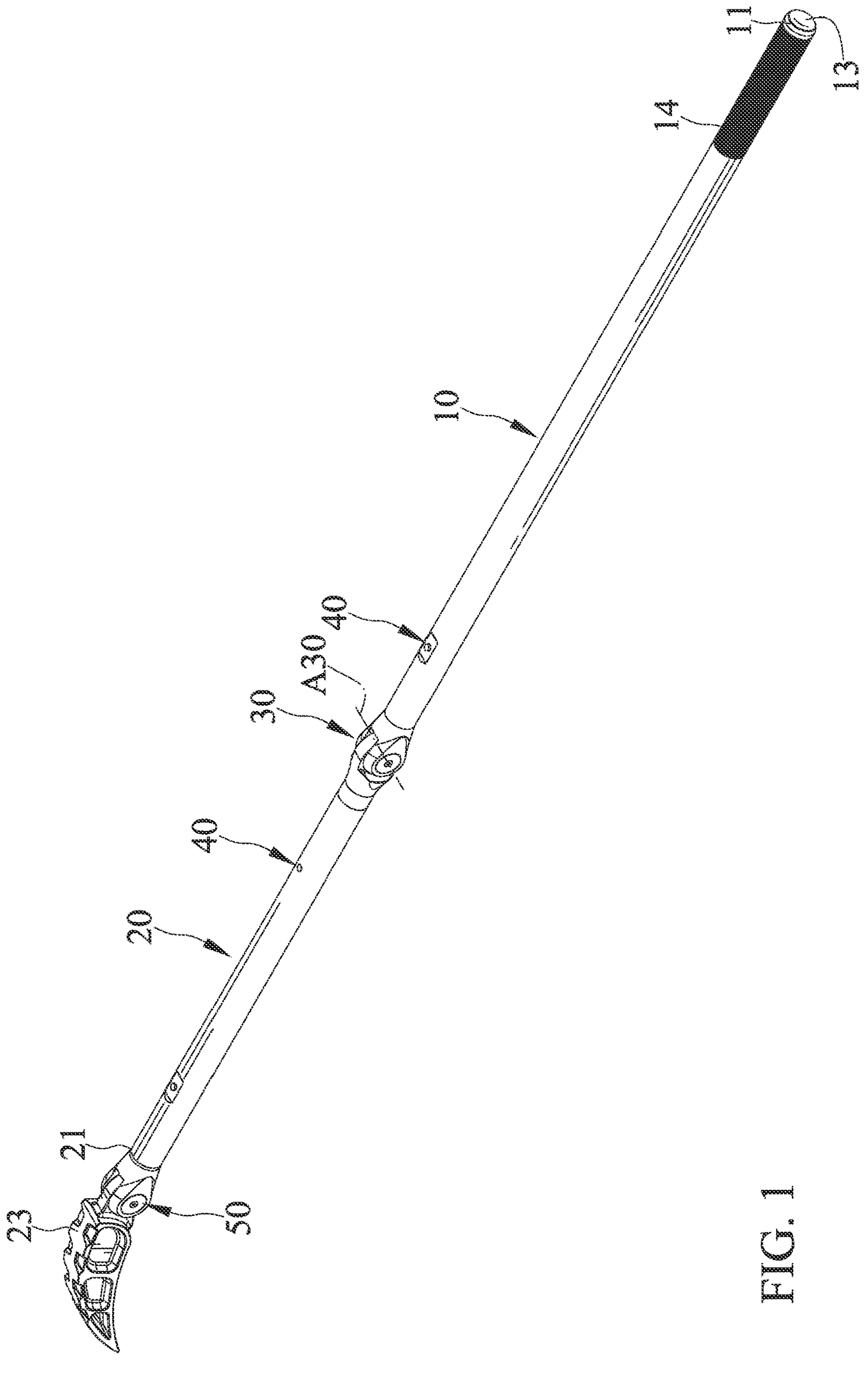
FIG. 1 is a perspective view of a foldable hand tool of a first embodiment according to the present invention.
Figure 2:
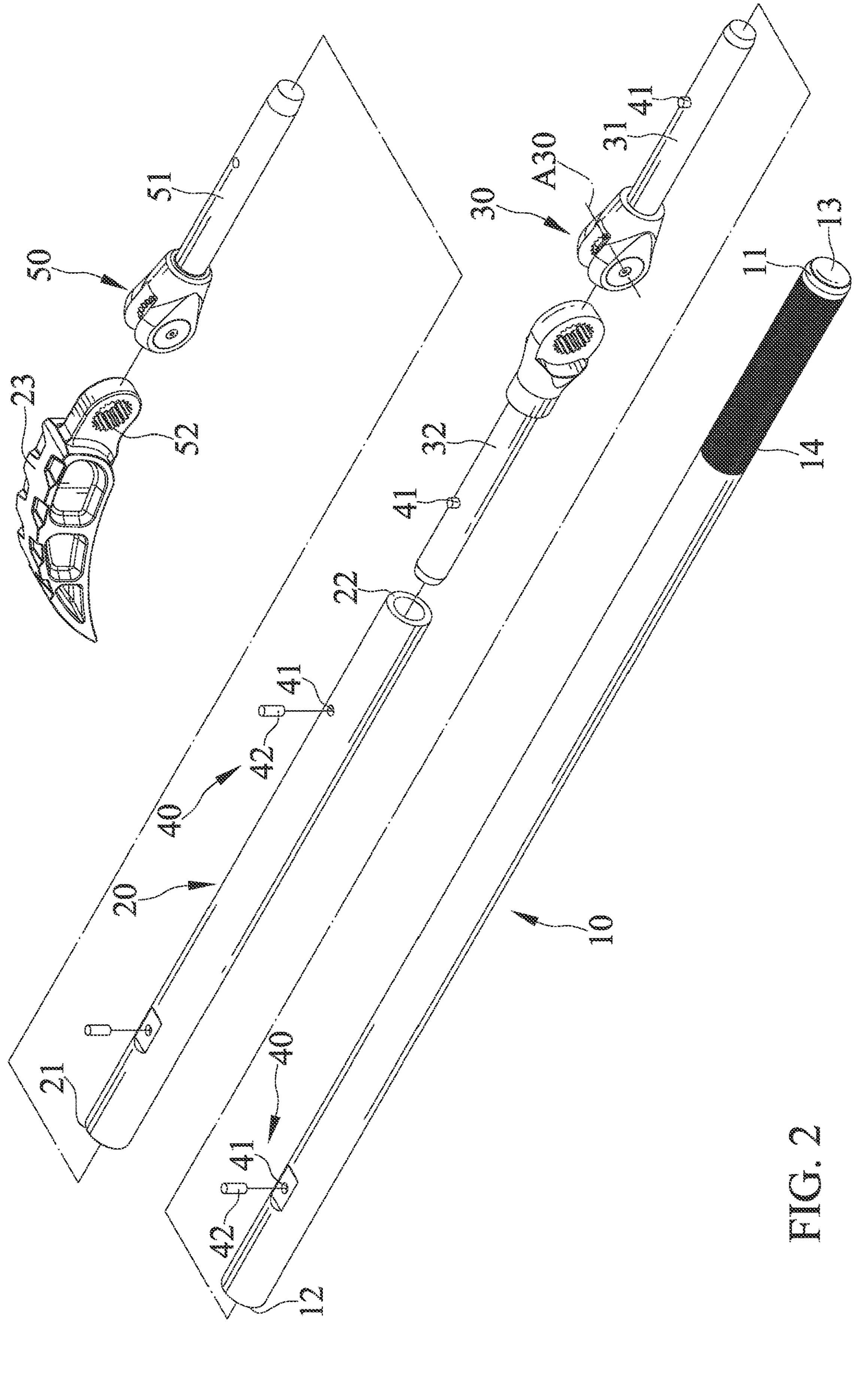
FIG. 2 is an exploded perspective view of the foldable hand tool of FIG. 1.
Figure 3:
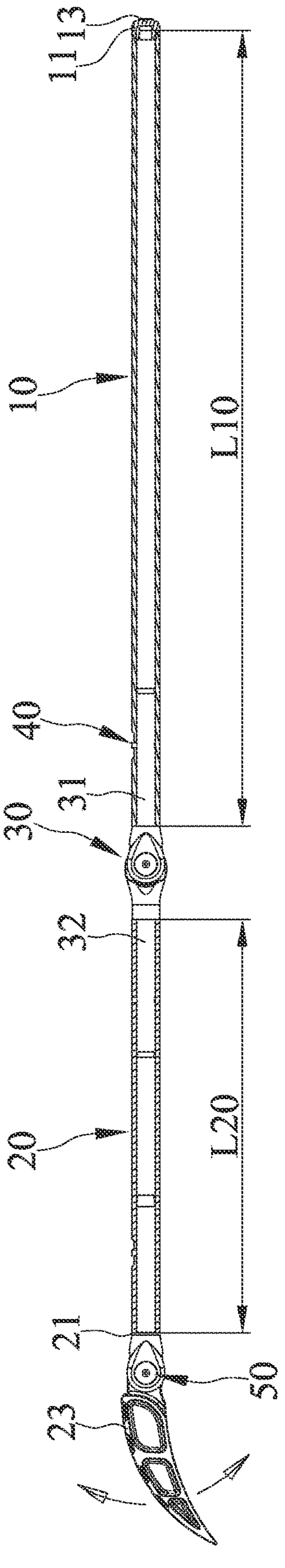
FIG. 3 is a cross sectional view of the foldable hand tool of FIG. 1.

FIGS. 1-3 show a foldable hand tool of a first embodiment according to the present invention. The tool includes a first rod member 10, a second rod member 20, a first pivoting device 30 and a second pivoting device 50. The first rod member 10 has a first distal end 11, a first proximal end 12 opposite to the first distal end 11 and a first length L10 defined between the first distal end 11 and the first proximal end 12. The second rod member 20 to has a second distal end 21, a second proximal end 22 opposite to the second distal end 21 and a second length L20 defined between the second distal end 21 and the second proximal end 22. The first pivoting device 30 is arranged between the first proximal end 12 and the second proximal end 22. Thus, the first rod member 10 and the second rod member 20 are configured to be selectively pivotable to each other via the first pivoting device 30, and a ratio of the first length L10 to the second length L20 is in a range between 1.1 and 6. Therefore, the first rod member 10 and the second rod member 20 can selectively pivotable to each other to cause the handle tool being foldable to reduce the overall length thereof, and the ratio of the first length L10 to the second length L20 is in a range between 1.1 and 6, which can reduce the overall length of the handle tool to facilitate storage or transportation.

In the embodiment, the ratio of the first length L10 to the second length L20 may be in a range between 1.9 and 3. The second rod member 20 is provided with a working portion 23 disposed at the second distal end 21, and the working portion 23 may be a gooseneck crowbar head. Further, the first rod member 10 and the second rod member 20 maybe respectively hollow, so as to reduce the weight for transportation and reduce the cost of production materials. In addition, the first rod member 10 is provided with a cover member 13 mounted at the first distal end 11 and a slip-proof portion 14 formed on an outer periphery thereof and adjacent to the cover member 13 and easier for the user to hold and apply force.

The first pivoting device 30 includes a first pivoting member 31 and to a second pivoting member 32 pivotally coupled to the first pivoting member 31. The first pivoting member 31 is fixed to the first proximal end 12 of the first rod member 10 via a first fastening device 40. The second pivoting member 32 is fixed to the second proximal end 22 of the second rod member 20 via a second fastening device 40. The first pivoting member 31 and the second pivoting member 32 are configured to be switchable between a locked position and an unlocked position to selectively pivot relative to each other about a pivoting axis A30.

Each of the first fastening device 40 and the second fastening device 40 includes two fastening holes 41 and a fastener 42 fixedly inserted through the two fastening holes 41. For example, the first pivoting member 31 is fixed to the first proximal end 12 of the first rod member 10 via the first fastening device 40, that is, two fastening holes 41 are respectively arranged on the first pivoting member 31 and the first proximal end 12, and the fastener 42 is fixedly inserts through the fastening hole 41 on the first pivoting member 31 and the fastening hole 41 on the first proximal end 12. Similarly, the second pivoting member 32 is fixed to the second proximal end 22 of the second rod member 20 via the second fastening device 40, that is, two fastening holes 41 are respectively arranged on the second pivoting member 32 and the second proximal end 22, and the fastener 42 is fixedly inserts through the fastening hole 41 on the second pivoting member 32 and the fastening hole 41 on the second proximal end 22. Further, a tight fit may be applied between the two fastening holes 41 and the fastener 42.

Furthermore, the second pivoting device 50 is arranged between the second distal end 21 and the working portion 23. The second distal end 21 and the working portion 23 are configured to be selectively pivotable to each other via the second pivoting device 50. The second pivoting device 50 includes a third pivoting member 51 and a fourth pivoting member 52 pivotally coupled to the third pivoting member 51. The third pivoting member 51 is fixed to the second distal end 21, and the fourth pivoting member 52 is formed at the working portion 23.

Figure 4:
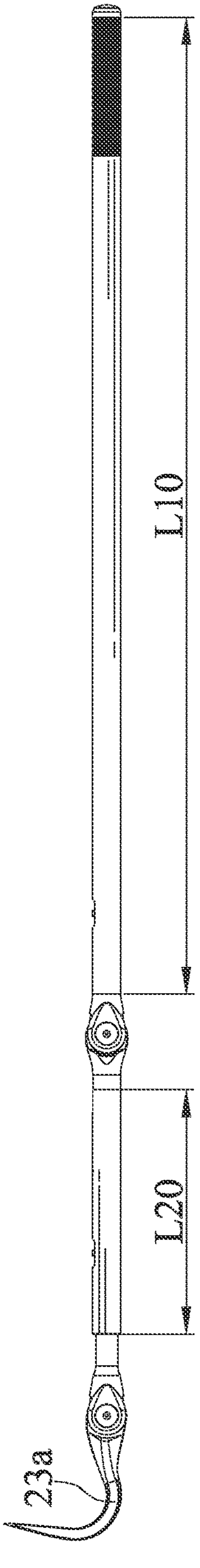
FIG. 4 is a side view of a foldable hand tool of a second embodiment according to the present invention.

FIG. 4 shows a foldable hand tool of a second embodiment according to the present invention. The second embedment is substantially the same as the first embodiment. The main differences are that the ratio of the first length L10 to the second length L20 is in a range between 3 and 4, and the working portion 23*a* is a 90 degree angled crowbar head.

Figure 5:
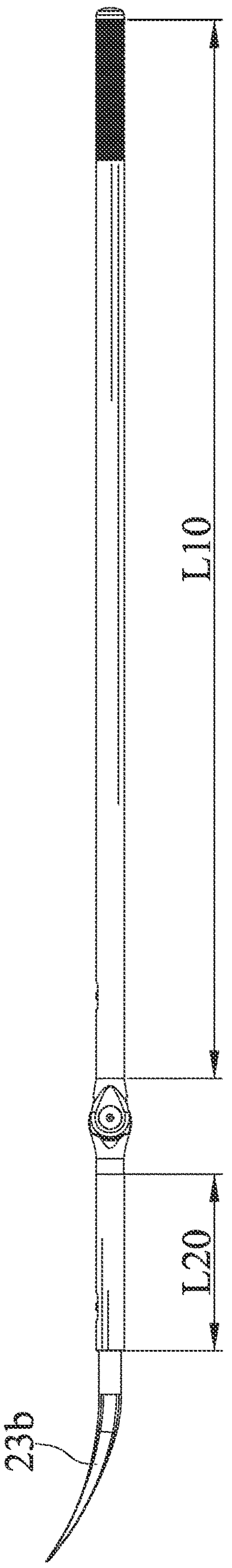
FIG. 5 is a side view of a foldable hand tool of a third embodiment according to the present invention.

FIG. 5 shows a foldable hand tool of a third embodiment according to the present invention. The second embedment is substantially the same as the first embodiment. The main differences are that the ratio of the first length L10 to the second length L20 is in a range between 4 and 6, and the working portion 23*b* is an oblique crowbar head.

Although specific embodiments have been illustrated and described, numerous modifications and variations are still possible without departing from the scope of the invention. The scope of the invention is limited by the accompanying claims.

The invention claimed is:

1. A foldable hand tool comprising:

a first rod member having a first distal end, a first proximal end opposite to the first distal end and a first length defined between the first distal end and the first proximal end;

a second rod member having a second distal end, a second proximal end opposite to the second distal end and a second length defined between the second distal end and the second proximal end, wherein a ratio of the first length to the second length is in a range between 1.1 and 6, and wherein the second rod member is provided with a working portion disposed at the second distal end;

a first pivoting device arranged between the first proximal end and the second proximal end, wherein the first rod member and the second rod member are configured to be selectively pivotable to each other via the first pivoting device; and a second pivoting device arranged between the second distal end and the working portion, wherein the second distal end and the working portion are configured to be selectively pivotable to each other via the second pivoting device, wherein the second pivoting device includes a third pivoting member and a fourth pivoting member pivotally coupled to the third pivoting member, wherein the third pivoting member is fixed to the second distal end, and wherein the fourth pivoting member is formed at the working portion.

2. The foldable hand tool as claimed in claim 1, wherein the ratio of the first length to the second length is in a range between 1.9 and 3.

3. The foldable hand tool as claimed in claim 1, wherein the ratio of the first length to the second length is in a range between 3 and 4.

4. The foldable hand tool as claimed in claim 1, wherein the ratio of the first length to the second length is in a range between 4 and 6.

5. The foldable hand tool as claimed in claim 1, wherein the working portion is a gooseneck crowbar head, a 90 degree angled crowbar head, or an oblique crowbar head.

6. The foldable hand tool as claimed in claim 1, wherein the first rod member and the second rod member are respectively hollow.

7. The foldable hand tool as claimed in claim 6, wherein the first rod member is provided with a cover member mounted at the first distal end and a slip-proof portion formed on an outer periphery thereof and adjacent to the cover member.

8. The foldable hand tool as claimed in claim 1, wherein the first pivoting device includes a first pivoting member and a second pivoting member pivotally coupled to the first pivoting member, wherein the first pivoting member is fixed to the first proximal end of the first rod member via a first fastening device, wherein the second pivoting member is fixed to the second proximal end of the second rod member via a second fastening device, and wherein the first pivoting member and the second pivoting member are configured to be switchable between a locked position and an unlocked position to selectively pivot relative to each other about a pivoting axis.

9. The foldable hand tool as claimed in claim 8, wherein each of the first fastening device and the second fastening device includes two fastening holes and a fastener fixedly inserted through the two fastening holes.

* * * * *